H. A. PERKINS.
BELT SHIFTER AND TIGHTENER.
APPLICATION FILED JULY 30, 1909.

964,051. Patented July 12, 1910.

WITNESSES
L. B. Baker
K. E. Klein.

INVENTOR
H. A. Perkins,
BY
Benj. R. Catlin,
ATTORNEY

UNITED STATES PATENT OFFICE.

HIRAM A. PERKINS, OF ROCHESTER, NEW YORK, ASSIGNOR TO AMERICAN WOOD WORKING MACHINERY CO., OF ROCHESTER, NEW YORK, A CORPORATION OF PENNSYLVANIA.

BELT SHIFTER AND TIGHTENER.

964,051.

Specification of Letters Patent. Patented July 12, 1910.

Application filed July 30, 1909. Serial No. 510,378.

*To all whom it may concern:*

Be it known that I, HIRAM A. PERKINS, a citizen of the United States, residing at Rochester, in the county of Monroe and State of New York, have invented a new and useful Improvement in Belt Shifters and Tighteners, of which the following is a specification.

My invention relates to such machines as require stopping and starting frequently by means of tight and loose pulleys and a shifting belt, and it more especially relates to woodworking and other machines with roller feed mechanism requiring change of speed by means of driving pulleys of various diameters; and it consists of the devices and combination of parts more fully described herein.

Figure 1:
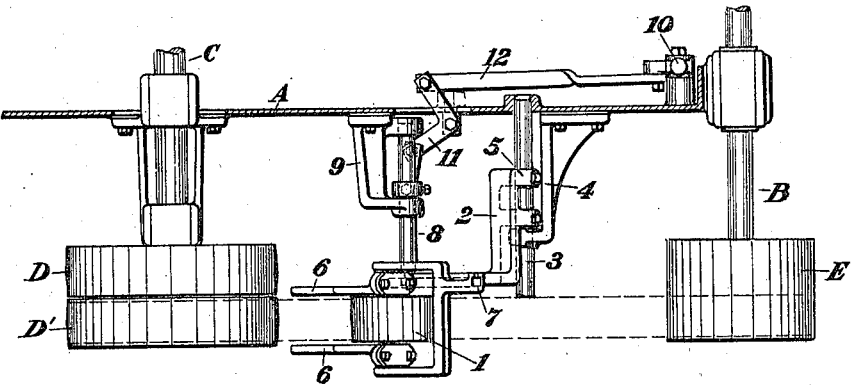
Figure 2:
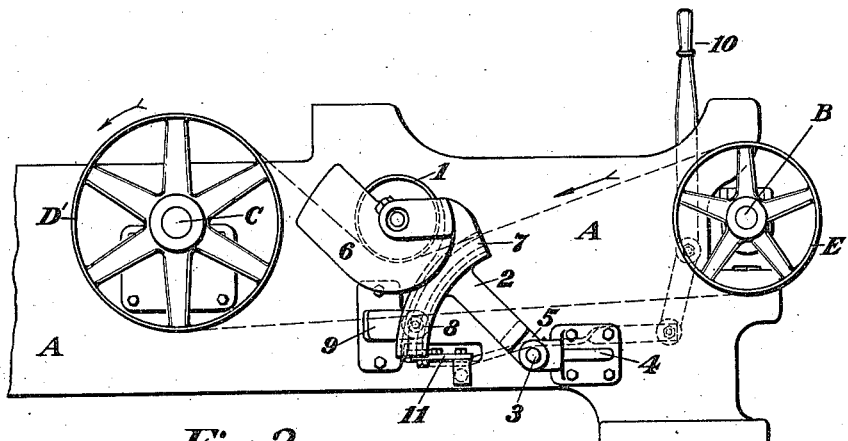
Figure 3:
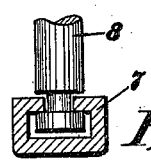
Figure 4:
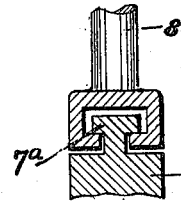

In the drawings, Figure 1 is a plan view of my invention as applied to a wood planer and matcher. Fig. 2 is a side elevation, and Figs. 3 and 4 show details.

A, Figs. 1 and 2, is the side frame of a wood planing machine upon which is mounted a countershaft B, in any suitable manner.

C is the feed shaft which in machines of this kind actuates the feed rollers by means of gearing (not shown).

D, D', are tight and loose pulleys attached to shaft C, and E is the feed driving pulley on countershaft B, having a wide straight face upon which the belt is shifted to stop and start the feed mechanism connected to shaft C.

The above combination of parts is common in this class of machines and others having similar requirements.

In order to change the speed of shaft C, and consequently that of the feed, it is necessary to remove the driving pulley E, and replace it with others either larger or smaller in diameter. This involves the use of as many belts as there are changes of feed on account of their various lengths. When a binder is used without tight and loose pulleys, the feed cannot be stopped except by lifting the binder pulley from the belt, which, however, does not invariably stop the shaft C, on account of the weight of the belt which is generally sufficient to continue the motion when no stock is being worked. Or, if tight and loose pulleys are used together with a binder pulley, then the latter must be very wide on the working face and consequently heavy and cumbersome.

For obviating difficulties mentioned I have devised a combined tightener and belt shifter which can be readily adjusted by the operator, requires only one feed belt, and fully controls the feeding devices.

A pivot shaft 3 has bearings in the bracket 4, bolted to the frame A. Upon this shaft is mounted a tightener frame 2, so constructed as to support by suitable bearings the binder pulley 1. The shaft 3 may be either secured to the bracket 4, and the supporting arms 5 of the tightener frame slide upon it, or the shaft may be secured to the tightener frame and slide freely through its bearings in bracket 4. In either case the tightener frame pivots on this shaft and is capable of a longitudinal movement transversely to the running line of the belt.

To the frame 2 I attach cheeks or belt guiding plates 6, one each side of the binder pulley and sufficiently apart to receive the belt freely edgewise, as indicated in Fig. 1. On account of the direction of motion as shown by the arrows in Fig. 2, binder pulley 1 is thus always on the slack strand or run of the belt, and the guide plates 6, being located near the receiving side of pulleys D, D', act directly to shift the belt when called upon.
For the purpose of shifting the frame 2 and binder pulley, I provide a segment 7, the axis of which is the center of the shaft 3. This segment is a part of, or attached rigidly to, the tightener frame 2, and it may be T slotted circumferentially, as shown in Fig. 3, or have a T shaped circumferential rib 7ª, as in Fig. 4. 8 is an adjustment bar or member so formed at the end as to move freely in the T slot of the segment 7, (or along the T-shaped part 7ª of body 7) and it is supported on the frame A by a bracket 9 on which is has sliding bearings. A hand lever 10 is pivoted on the frame A convenient for the operator, and is connected to the sliding bar 8, by means of the bell crank 11 and suitable links, whereby when required the tightener frame 2 and pulley 1 may be moved transversely to the running line of the belt sufficiently to shift the belt from the tight to the loose pulley, or vice versa, such movement not affecting the action of the binder 1 on the belt at any time.

I do not wish to be confined to the particular means of connecting the lever 10 with the bar 8 shown and described, as other equivalent devices would no doubt accomplish a like result. Furthermore the bracket 4 may be a part of the frame A, and the pivot shaft 3 extend across the machine and have a bearing in the opposite side frame, thus simplifying the construction, but not affecting the operation.

It will be observed that by the location of the adjusting bar 8, between the pivot shaft 3 and the binder pulley and cheeks 6, the tendency to cramp the frame 2 on the guide shaft 3 is relieved, and it moves easily thereon. By the loose connection of the bar 8 to the segment 7, the binder pulley 1 is free to take any vertical position required by the belt.

What I claim as my invention and desire to secure by Letters Patent is:

1. In combination with a belt, a belt tightener comprising a binder pulley, a supporting frame pivoted to swing freely, said frame being adapted to have a sliding movement transversely to the running line of the belt, side guides or cheeks on said frame embracing the belt, and means comprising a reciprocatory adjusting member having a loose operating connection with said frame permitting the latter to swing with respect to said adjusting member thus changing the point of connection for producing said transverse movement, whereby the belt may be shifted at will by an operator, independently of the action of the binder pulley on the belt.

2. In combination with a belt, a belt tightener comprising a binder pulley, a supporting frame, a rod or shaft acting as a pivot upon which said frame swings, the frame also being capable of sliding adjustment transversely to the line of the belt, a circular segment attached to the frame, an adjusting member connected to said segment, the segment being movable freely with respect to said member as the segment swings, and means for controlling the transverse movement of said adjusting member and thereby the movement of the tightener frame.

3. In combination with a belt, a belt tightener comprising a binder pulley adapted to bear on the belt, a supporting rod or shaft acting as a pivot upon which said frame swings from the end opposite said binder pulley, and along the axis of which it may be adjusted transversely to the line of the belt, side guides or cheeks attached to said frame, and embracing the belt, and means comprising a swinging member and a non-swinging member connected thereto in all positions of the swinging member for adjusting said tightener frame transversely to the running line of the belt, for the purpose described.

4. In combination with a belt, a belt tightener comprising a binder pulley, a supporting frame, a rod or shaft acting as a pivot upon which said frame swings, and along the axis of which it may be adjusted transversely to the running line of the belt, side guides or cheeks attached to said frame and embracing the belt, a circular segment also attached to the frame, an adjusting member connected to said segment, the segment being movable circumferentially with respect to said member, means for moving said adjusting member and thereby moving the attached parts along the axis of the pivot shaft, whereby the shifting of the belt is made independent of the action of the binder pulley on it.

5. In combination with a belt, a belt tightener comprising a binder pulley, a supporting frame, a rod or shaft acting as a pivot upon which said frame swings at one end, and along the axis of which the frame may be adjusted, side guides attached to said frame for the purpose of shifting the belt, a circular segment attached to the frame, a shifting bar connected to said segment but having a freely changing connection therewith as the segment swings, a bell-crank pivoted to the frame of the machine and connected to said shifting bar, and an operating lever.

6. In combination with a belt, a belt tightener comprising a binder pulley, a supporting frame pivoted to swing to and from the face of the belt, and capable of adjustment transversely to the line of the belt, a segment attached to said frame at a point between its pivot and the axis of the binder pulley, an adjusting bar connected to said segment but permitting the segment to move with respect to it circumferentially and means for moving said adjusting bar and thereby moving the segment and frame at will, whereby such adjustment is accomplished without cramping the pivot shaft or its bearings.

7. The combination in a roller feed mechanism, of a drive shaft, a pair of tight and loose pulleys thereon, a belt, a swinging tightener frame extending above the belt on said pulleys, a binder pulley boxed on said frame and adapted to bear downwardly by gravity on such belt, said tightener frame being adapted to slide transversely to the run of the belt, belt guiding cheeks on said tightener frame, and means within reach of the operator for sliding the tightener transversely independently of the action of the binder pulley on the belt, said means being connected to the sliding tightener by an automatically changing connection near to the pulley and operative in all positions of the tightener, for the purpose set forth.

In testimony whereof I have signed my name to this specification in the presence of two subscribing witnesses.

HIRAM A. PERKINS.

Witnesses:
  G. C. SOUTHARD,
  GRACE GRAHAM.